United States Patent [19]

Ward

[11] 4,135,761

[45] Jan. 23, 1979

[54] LOAD BODY FOR A PICKUP TRUCK

[76] Inventor: Charles A. Ward, 2100 Del Amo Way, Bakersfield, Calif. 93305

[21] Appl. No.: 787,551

[22] Filed: Apr. 14, 1977

[51] Int. Cl.$^2$ .................. B62D 33/04

[52] U.S. Cl. .................. 296/37.6

[58] Field of Search .................. 296/37.6

[56] References Cited

U.S. PATENT DOCUMENTS

| | | | |
|---|---|---|---|
| 527,339 | 10/1894 | Lins | 296/37.6 |
| 3,245,713 | 4/1966 | Ogilvie | 296/37.6 |

*Primary Examiner*—Philip Goodman
*Attorney, Agent, or Firm*—Max E. Shirk

[57] ABSTRACT

Each outer sidewall assembly, which includes a top rail and a rear end piece, is hinged to the truck in spaced relation with its associated inner sidewall portion of the load body to form a storage compartment on each side of the load body.

4 Claims, 4 Drawing Figures

14
136
52
12
60
132
130
126
126
16
10
30

92
90
38
66
58
68
34
34
70
78
72
80
50
74
76
57

56

10
34
96
101
100
116
110
74
98
114
124
118
102
122
57
106
104
108

LOAD BODY FOR A PICKUP TRUCK

BACKGROUND OF THE INVENTION

The background of the invention will be set forth in two parts.

1. Field of the Invention

The present invention pertains generally to the field of load bodies for pickup trucks and more particularly to a new and useful load body wherein a storage compartment is formed on each side of the load body by hinging the outer sidewall portion of the load body to the truck in spaced relation with the inner sidewall.

2. Description of the Prior Art

The prior art known to applicant is listed by way of illustration, but not of limitation, in separate communications to the United States Patent Office.

The present invention exemplifies improvements over this prior art.

SUMMARY OF THE INVENTION

According to the present invention, a new and useful load body is provided for a pickup truck. A load body may be constructed in accordance with the teachings of the present invention at the factory or a conventional load body may be converted to a load body of the present invention.

Conventionally, a pickup load body includes an inner sidewall for retaining a load and an outer sidewall including a top rail, which joins the outer sidewall to the inner sidewall, an end piece, which usually carries a tail light and closes the space between the inner sidewall and the tail gate, and a lower edge which is positioned outside the rear wheels so that the outer sidewall may be contoured to blend with the overall contour of the vehicle. This results in a construction wherein the upper portion of the outer sidewall is closely adjacent the inner sidewall and the lower portion of the outer sidewall is spaced a considerable distance from a vertical plane which would be occupied by the inner sidewall were it to be extended downwardly to the horizontal plane occupied by the lower edge of the outer sidewall. When a conventional load body is converted in accordance with the present invention, the outer sidewall assembly, including the top rail and rear end piece, is removed; a new rear end piece, which is somewhat wider and conforms to the contour of, the former end piece, is installed; a new front end piece, which includes a portion forming a continuation of the outer sidewall in shape and appearance, is also installed; a new top rail is then affixed to the upper edge of the inner sidewall and extends outwardly a predetermined distance to form an abutting edge for the inner edge of the top rail on the outer sidewall after its lower edge has been swingably connected to the truck and the outer sidewall is swung to a closed position; a bottom wall and an end wall are installed to form a compartment in the large open area between the lower edge of the outer sidewall and the pickup chassis; and suitable reinforcing members and hinges are affixed to the compartment bottom wall for swingably connecting the lower edge of the outer sidewall to the bottom wall of the compartment. Thus, a large storage compartment is formed by the outer sidewall, the end pieces, the outer surface of the load-body inner sidewall, the undersurface of the outer edge of the load-body bottom wall, the new end wall and the new bottom wall. This conversion is, of course, done on both sides of the load body.

The present invention comprises an improvement in a pickup truck of the type which has a load body including an inner sidewall and an outer sidewall assembly including a first top rail and a rear end wall portion. This improvement includes a bottom wall and hinges for swingably connecting the outer sidewall assembly to the truck in spaced relationship to the inner sidewall for forming a compartment between the sidewalls, a second top rail affixed to the inner sidewall for coacting with the first top rail to close the top of the compartment and front and rear end pieces closing the front and rear portions of the compartment with the end pieces being contoured and decorated in a manner such that the front end piece forms a continuation of the outer sidewall assembly appearance wise and the rear end piece conforms approximately to the appearance of the rear end wall portion of the outer sidewall assembly and coacts therewith to close the rear of the compartment when the outer sidewall assembly is swung to a closed position.

The compartment may include an extending portion having a bottom wall, a pair of sidewalls, a top wall and an end wall each of which extends beyond the rear of the load body to a position such that the end wall of the extending portion forms a rear bumper on the truck. At least one door may be swingably mounted on the end wall of the extending portion for providing access to the storage space provided by the extending portion. Suitable shelves and bins may be provided in the compartment. Access to the extending portion may also be had through the main portion of the compartment.

The features of the present invention which are believed to be novel are set forth with particularity in the appended claims. The present invention, both as to its organization and manner of use, together with the objects and advantages thereof, may best be understood by reference to the following description, taken in connection with the accompanying drawings in which like reference characters in the several views.

DESCRIPTION OF THE PREFERRED EMBODIMENT

Figure 1:
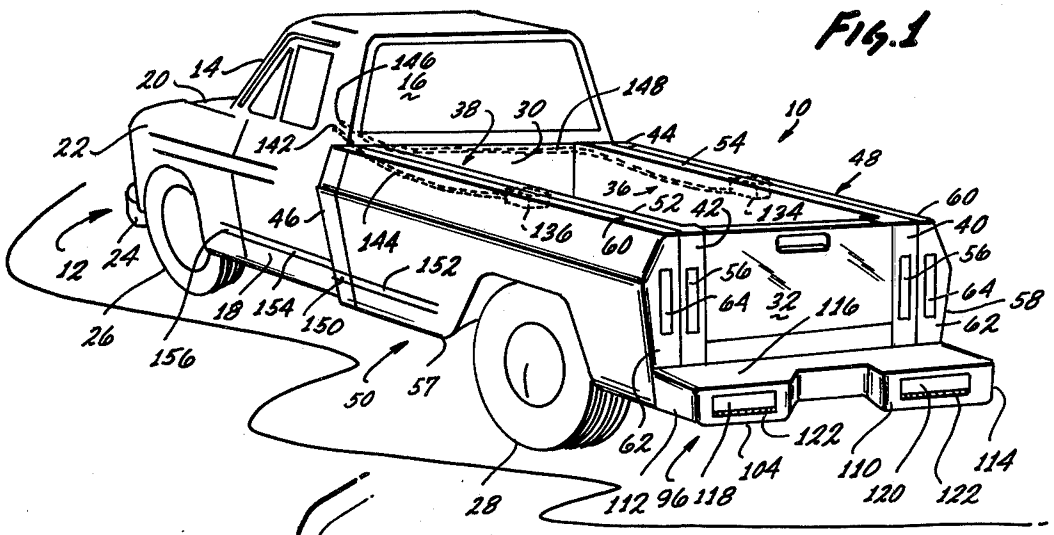
FIG. 1 is a perspective view of a pickup truck equipped with a load body of the present invention.

Referring again to the drawings, a load body constituting a presently-preferred embodiment of the invention, generally designated 10, forms the rear body portion of a pickup truck 12 including a cab 14 having a rear window 16, a left door assembly 18, a hood 20 and a left front fender 22. Truck 12 also includes a front bumper 24, a left front wheel 26 and a left rear wheel 28.

Load body 10 includes a front wall 30, a tailgate 32, a bottom wall or bed 34, a right inside sidewall assembly 36, a left inside sidewall assembly 38, a right rear end piece 40, a left rear end piece 42, a right front end piece 44, a left front end piece 46, a right outside sidewall assembly 48 and a left outside sidewall assembly 50.

Load body 10 also includes a left top rail 52 extending along the tops of end piece 46, left inside sidewall assembly 38 and left rear end piece 42 and a right top rail 54 extending along the tops of front end piece 44, right inside sidewall assembly 36 and right rear end piece 40. A tail light 56 may be provided on each end piece 40, 42, if desired.

Figure 3:
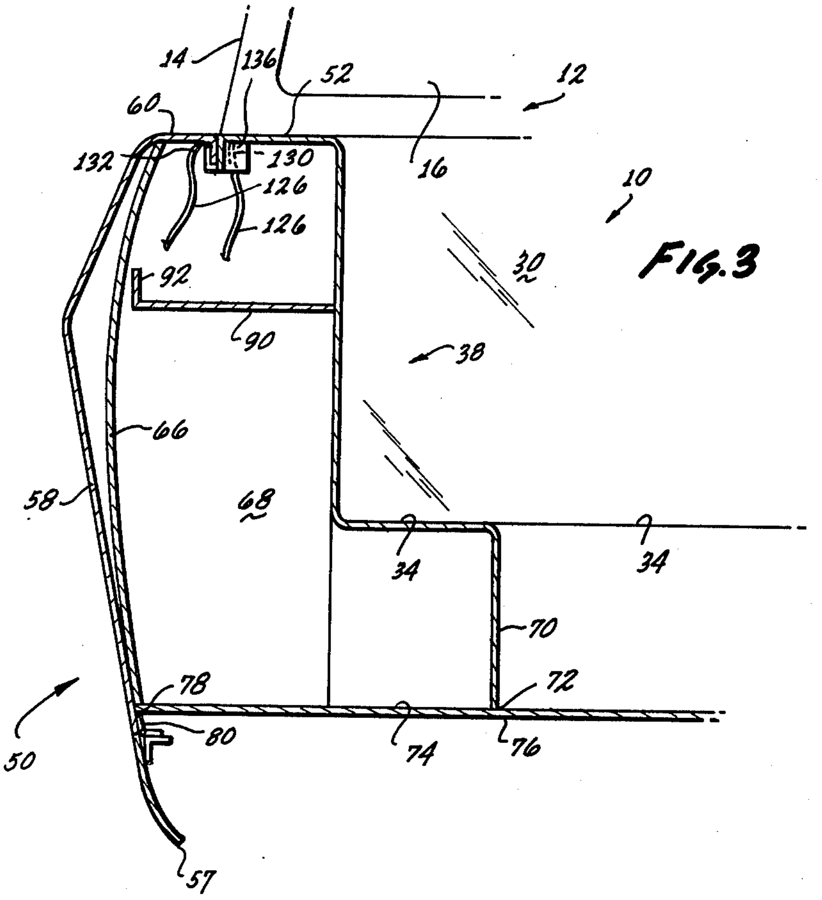
FIG. 3 is an enlarged, partial cross-sectional view taken along line 3—3 of FIG. 2.

Each sidewall assembly 48, 50 includes a lower edge portion 56, a sidewall portion 58, a top rail portion 60 and a rear end piece 62. The rear end pieces 62 may each be provided with a tail light 64 and each sidewall portion 58 may be reinforced with a sheet metal plate 66 (FIG. 3). The sidewall assemblies 48, 50 each forms a swingable door into a storage compartment which is shown at 68 for the left hand side of load body 10. Since both of these storage compartments are identical, only the one for the left hand side will be described.

The front end pieces 44, 46 and the rear end pieces 40, 42 and 62 close the front and rear portions of these compartments when sidewall assemblies 48, 50 are closed, as shown in FIG. 1. These end pieces are contoured and decorated in a manner such that the front end pieces form continuations of their associated outer sidewall assemblies appearance wise and the rear end pieces 40, 42 conform approximately to the appearance of the rear end piece portions of sidewall assemblies 48, 50 and coact therewith to close the rear end of an associated one of the compartments.

Figure 2:
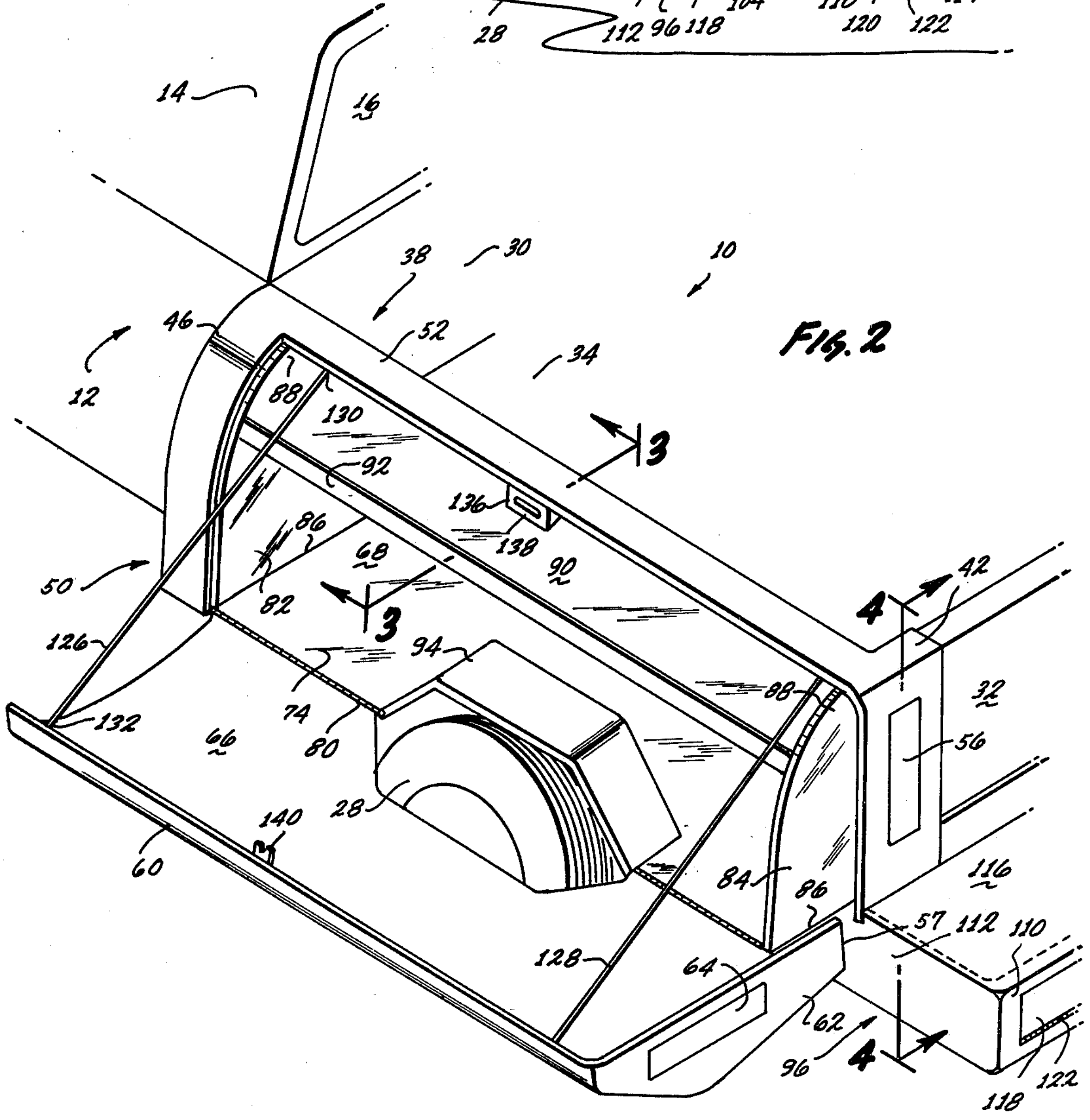
FIG. 2 is an enlarged, partial perspective view of the load body of FIG. 1 showing an outer sidewall assembly of the present invention in an open position.

Referring now more in particular to FIGS. 2 and 3, each compartment 68 includes an inside vertical wall 70 (FIG. 3) depending from bed 30 inwardly of inner sidewall 38 in a vertical plane immediately adjacent the frame (not shown) on truck 12. Wall 70 extends the full length of bed 34 and includes a lower edge 72 lying in a horizontal plane slightly above the lower edge 57 of the outside sidewall assembly 50. Compartment 68 also includes a bottom wall 74 having an inner edge 76 affixed to the lower edge 72 of wall 70 and an outer edge 78 to which a hinge 80 is affixed for swingably connecting outer sidewall assembly 50 to truck 12. Bottom wall 74 may be reinforced and supported by a front gusset plate 82 and a rear gusset plate 84 each having a lower end 86 affixed to bottom wall 74 and an upper end 88 affixed to top rail 52. A storage shelf 90 may have its ends affixed to gusset plates 82, 84 and is provided with a lip 92 along its outside edge for retaining small articles in postion on shelf 90. Bottom wall 74 includes an upwardly extending portion 94 forming a wheel well for wheel 28.

Figure 4:
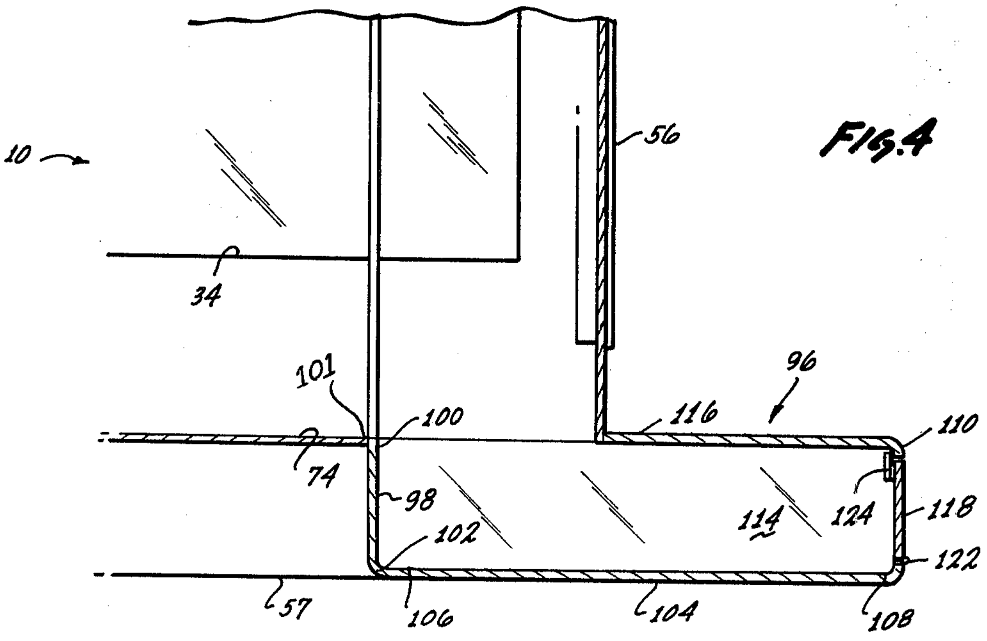
FIG. 4 is an enlarged, partial cross-sectional view taken along line 4—4 of FIG. 2.

Referring now to FIGS. 1, 2 and 4, compartment 68 includes a rearwardly-extending portion 96 including a front wall 98 (FIG. 4) having an upper end 100 affixed to the rear edge 101 of bottom wall 74 and a lower edge 102 lying in the same horizontal plane as the lower edge 57 of each outer sidewall assembly 48, 50. The rearwardly-extending portion 96 of compartment 68 also includes a bottom wall 104 having a front edge 106 affixed to the lower edge 102 of wall 98 and a rear edge 108 affixed to an end wall 110 forming a rear bumper for truck 12. Rearwardly-extending portion 96 also includes a pair of sidewalls 112, 114 which support a top wall 116. Articles may be placed in rearwardly-extending portion 96 through a pair of access doors 118, 120 each swingably connected to rear wall 110 by a hinge 122. As best seen in FIG. 4 for the door 118, each door may be secured in a closed position by a suitable latch 124. It is to be understood that front wall 98 may be eliminated by dropping bottom wall 74 down to the plane of lower edge 57 and by affixing hinge 80 to lower edge 57.

Referring now to FIGS. 1, 2 and 3, the outer sidewall assemblies 48, 50 may each be maintained in an open position by suitable cables, like the pair shown at 126, 128 for the sidewall assembly 50. Each cable includes a first end 130, which may be connected to top rail 52, and a second end 132, which may be connected to top rail 60. The sidewall assemblies 48, 50 may be maintained in a closed position by locks 134, 136, respectively, each including a solenoid-actuated latch 138, which is mounted on top rail 52, and a bifurcated hook 140, which is mounted on top rail 60. Lock 134 may be connected to an electrical switch 142, which may be mounted inside cab 14, by a wiring harness 144 and latch 136 may be connected to an electrical switch 146 by a wiring harness 148.

Referring now to FIG. 1, end pieces 44, 46 may be made to conform more to the appearance of their associated sidewall assemblies by providing them with decorative moldings, as shown at 150 for the end piece 46. This molding matches the moldings 152, 154 and 156 affixed to sidewall assembly 50, door 18 and fender 22, respectively.

In use, electric switches 142, 146 may be actuated to gain access to storage compartment 68 through sidewall assemblies 48, 50, respectively, by releasing latches 134, 136, respectively and permitting sidewall assemblies 48, 50 to swing to the open position shown for the sidewall assembly 50 in FIG. 2. In this position, sidewall assembly 50 is supported by cables 126, 128. It will be seen that storage compartments 68 provide large and adequate storage areas in what is usually a large, open-bottomed area in conventional pickup trucks.

While the particular load body herein shown and described in detail is fully capable of attaining the objects and providing the advantages hereinbefore stated, it is to understood that it is merely illustrative of the presently-preferred embodiment of the invention and that no limitations are intended to the details of construction or design herein shown other than as defined in the appended claims, which form a part of this disclosure.

Whenever the term "means" is employed in these claims, this term is to be interpreted as defining the corresponding structure illustrated and described in this specification or the equivalent of same.

What is claimed is:

1. In a pickup truck of the type which has a load body including an inner sidewall and an outer sidewall assembly, said outer sidewall assembly including a first top rail and a rear end wall portion, the improvement which comprises:

means swingably connecting said outer sidewall assembly to said truck in spaced relationship to said inner sidewall for forming a compartment between said inner and outer sidewalls, said compartment having an extending portion including a bottom wall, a pair of sidewalls, a top wall and an end wall each of which extends beyond the rear of said load body to a position such that said end wall of said extending portion forms a rear bumper on said truck;

a second top rail affixed to said inner sidewall for coacting with said first top rail to close the top of said compartment; and front and rear end pieces closing the front and rear portions of said compartment, respectively, said end pieces being contoured and decorated in a manner such that said front end piece forms a continuation of said outer sidewall assembly appearance wise and said rear end piece conforms approximately to the appearance of a rear end wall portion of said outer sidewall assembly and coacts therewith to close the rear of said compartment when said outer sidewall assembly is swung to a closed position.

2. An improvement as stated in claim 1 including a door swingably mounted on the end wall of said extending portion for providing access to the storage space provided by said extending portion.

3. A load body for a pickup truck having a cab and a pair of rear wheels, said load body comprising:

a bed mounted on said truck between said rear wheels, said bed having a front edge, two side edges and a rear edge;

a first sidewall upstanding on one of said side edges of said bed adjacent one of said rear wheels;

a second sidewall upstanding on the other of said side edges of said bed adjacent the other of said rear wheels; first and second rear end pieces affixed to said first and second sidewalls, respectively, on said rear edge of said bed for forming an opening for a tailgate;

first and second top rails affixed to said first and second end pieces and to said first and second sidewalls, respectively, each of said first and second top rails extending the full length of said bed;

at least one wall depending from said bed inwardly of an associated one of said first and second sidewalls, said depending wall extending the full length of said bed and having a lower edge;

at least one compartment bottom wall having an inner edge affixed to the lower edge of an associated one of said depending walls and an outer edge lying in a plane outside of an associated one of said rear wheels, said bottom wall extending the full length of said bed and including an upwardly extending portion forming a wheel well;

a hinge affixed to said outer edge of said compartment bottom wall;

an outer sidewall assembly affixed to said hinge and extending the full length of said bottom wall, said outer sidewall assembly including a rear end piece and a top rail adapted to close against an associated one of said first and second rear end pieces and said first and second top rails, respectively, when said sidewall assembly is swung to a closed position; and a front end piece affixed to said compartment bottom wall and to said associated one of said first and second sidewalls for coacting with said outer sidewall assembly to close the compartment formed by said associated one of said first and second sidewalls, said depending wall and said compartment bottom wall, said front end piece being contoured and decorated in a manner such that it forms a continuation of said sidewall assembly and blends in with said cab.

4. A load body for a pickup truck having a cab and a pair of rear wheels, said load body comprising:

a bed mounted on said truck between said rear wheels, said bed having a front edge, two side edges and a rear edge;

a first sidewall upstanding on one of said side edges of said bed adjacent one of said rear wheels;

a second sidewall upstanding on the other of said side edges of said bed adjacent the other of said rear wheels;

first and second rear end pieces affixed to said first and second sidewalls, respectively, on said rear edge of said bed for forming an opening for a tailgate;

at least one wall depending from said bed inwardly of an associated one of said first and second sidewalls, said depending wall extending the full length of said bed and having a lower edge;

at least one compartment bottom wall having an inner edge affixed to the lower edge of an associated one of said depending walls and an outer edge lying in a plane outside of an associated one of said rear wheels;

a hinge affixed to said outer edge of said compartment bottom wall;

an outer sidewall assembly affixed to said hinge, said outer sidewall assembly including a rear end piece adapted to close against an associated one of said first and second rear end pieces when said sidewall assembly is swung to a closed position;

a front end piece affixed to said compartment bottom wall and to said associated one of said first and second sidewalls for coacting with said outer sidewall assembly to close the compartment formed by said associated one of said first and second sidewalls, said depending wall and said compartment bottom wall, said front end piece being contoured and decorated in a manner such that it forms a continuation of said sidewall assembly and blends in with said cab; and a solenoid-actuated latch affixed to said compartment for locking said sidewall assembly in its closed position.

* * * * *